(12) United States Patent
Graefe et al.

(10) Patent No.: US 12,271,198 B2
(45) Date of Patent: Apr. 8, 2025

(54) RESTRICTED AREA AUTONOMOUS VEHICLE CONTROL TECHNIQUES

(71) Applicant: Intel Corporation, Santa Clara, CA (US)

(72) Inventors: Ralf Graefe, Haar (DE); Michael Paulitsch, Ottobrunn (DE)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 17/129,679

(22) Filed: Dec. 21, 2020

(65) Prior Publication Data

US 2021/0109538 A1    Apr. 15, 2021

(51) Int. Cl.
| | |
|---|---|
| *G05D 1/02* | (2020.01) |
| *G05D 1/00* | (2024.01) |
| *H04L 12/40* | (2006.01) |
| *H04W 4/44* | (2018.01) |
| *H04W 12/06* | (2021.01) |

(52) U.S. Cl.
CPC ......... *G05D 1/0214* (2013.01); *G05D 1/0022* (2013.01); *H04L 12/40* (2013.01); *H04W 4/44* (2018.02); *H04W 12/06* (2013.01); *H04L 2012/40273* (2013.01)

(58) Field of Classification Search
CPC .. G05D 1/0214; G05D 1/0022; G05D 1/0282; H04L 12/40; H04L 2012/40273; H04L 12/40169; H04W 4/44; H04W 12/06; H04W 4/38; H04W 12/069; H04W 12/121; G08G 1/207
See application file for complete search history.

(56) References Cited

U.S. PATENT DOCUMENTS

| | | |
|---|---|---|
| 6,975,923 B2 | 12/2005 | Spriggs |
| 2014/0108785 A1 | 4/2014 | Lindteigen et al. |
| 2019/0384320 A1 | 12/2019 | Lee |
| 2020/0026546 A1 | 1/2020 | Lee et al. |

(Continued)

FOREIGN PATENT DOCUMENTS

| | | | |
|---|---|---|---|
| CN | 109714421 A | * | 5/2019 |
| CN | 111857132 | | 10/2020 |
| KR | 20130045289 | | 5/2013 |

(Continued)

OTHER PUBLICATIONS

"International Application Serial No. PCT US2021 049857, International Search Report mailed Jan. 3, 2022", 8 pgs.

(Continued)

*Primary Examiner* — Nga X Nguyen
(74) *Attorney, Agent, or Firm* — Schwegman Lundberg & Woessner, P.A.

(57) ABSTRACT

Various systems and methods for providing autonomous driving within a restricted area are discussed. In an examples, an autonomous vehicle control system can include an interface for receiving data from multiple sensors for detecting an environment about the vehicle, a security processor coupled to the configured to receive sensor information from the sensor interface, and autonomous driving system including one or more virtual machines configured to selectively receive information from the security processor based on a security request from infrastructure of the restricted area.

18 Claims, 6 Drawing Sheets

(56) References Cited

U.S. PATENT DOCUMENTS

2020/0198620 A1    6/2020  Nakata

FOREIGN PATENT DOCUMENTS

| KR | 20210051753 A  | * | 10/2019 | ........... G05D 1/0276 |
|----|----------------|---|---------|------------------------|
| TW | I799978        |   | 4/2023  |                        |
| WO | WO-2019026633 A1 | * | 2/2019 | ............ B60W 30/06 |
| WO | 2022139897     |   | 6/2022  |                        |

OTHER PUBLICATIONS

"International Application Serial No. PCT US2021 049857, Written Opinion mailed Jan. 3, 2022", 5 pgs.

"Automotive Intelligent Transport Systems (ITS)", https: web.archive.org web 20200808183910 https: www.etsi.org technologies automotive-intelligent-transport, (Aug. 8, 2020), 3 pgs.

"Teleoperated driving: safely controlling cars remotely", https: web.archive.org web 20200922214411 https: www.t-systems.com de en industries automotive connected-mobility teleoperated-driving, (Sep. 22, 2020), 10 pgs.

"Teleoperation", https: web.archive.org web 20200920024410 https: en.wikipedia.org wiki Teleoperation, (Sep. 20, 2020), 2 pgs.

"Taiwanese Application Serial No. 110132645, Response filed Nov. 4, 2022 to Office Action mailed Aug. 19, 2022", w English claims, 11 pgs.

"International Application Serial No. PCT US2021 049857, International Preliminary Report on Patentability mailed Jun. 29, 2023", 7 pgs.

"Taiwanese Application Serial No. 110132645, Office Action mailed Aug. 19, 2022", w English Translation, 10 pgs.

"European Application Serial No. 21911784.3, Extended European Search Report mailed Oct. 17, 2024", 12 pgs.

* cited by examiner

RESTRICTED AREA AUTONOMOUS VEHICLE CONTROL TECHNIQUES

TECHNICAL FIELD

Embodiments described herein generally relate to autonomous vehicle control systems, and in particular, to control techniques for an autonomous vehicle within a restricted area.

BACKGROUND

Access to geographical and infrastructure information has almost made physical maps obsolete as users can use mobile applications that can retrieve such geographical and infrastructure information and can plan a route for a journey between two or more locations. Autonomous vehicles can further employ various machine learning functions to guide a vehicle along a designated route for the journey. However, when a vehicle come to a restricted area, use of the autonomous guidance system of a vehicle can be prohibited.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

The present inventors have recognized techniques to allow for autonomous navigation of a vehicle within a restricted area. As used herein, a restricted area is one where people, animals, vehicles, and some assets are required to be verified or authenticated upon entering, upon exiting, at other times while within the area, or combinations thereof. Some restricted areas may have one or more other areas that are more restrictive to people and assets entering or leaving the area. Examples of such areas include, company, corporate, or movement campuses, such as military facilities. Such examples may have restricted areas that extend for several square miles or may involve a large building that can be navigate in a powered vehicle, such as an autonomous vehicle.

Autonomous vehicles (AVs) are vehicles that are capable of operating without human assistance. AVs may operate in a fully-autonomous mode or a partially-autonomous mode. When in a partially-autonomous mode, the AV may provide some autonomous functionality, such as lane departure monitoring, speed control, collision avoidance, or the like while the human operator performs other aspects of driving, such as steering. An example of an AV controller is provided in FIG. 1 and discussed further below.

AVs may include various forward, sideward, and rearward facing sensors. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

Techniques to enable an autonomous vehicle to autonomously navigate a restricted area while also accommodating the propriety goals involved with the restricted area are described below. For example, an aspect of the present subject matter is dynamically sharing of automated driving functionality between a vehicle and infrastructure of the restricted area. Such sharing becomes necessary because in exchange for permission to autonomously navigate a restricted area, the vehicle gives up certain sensing capabilities. In certain examples, the infrastructure can include several sensors of different types including multiple sensors overlapping coverage of many areas of the restricted area, one or more servers connected to the sensors using a low-latency, high bandwidth network and an interface for a wireless communication link to one or more autonomous vehicles. An example autonomous vehicle can include sensors and complete software stack for autonomous driving, a wireless communication interface for communicating with an infrastructure system, an authentication component, a virtual private network (VPN) client for a secure connection with the infrastructure system, and an infrastructure security platform for coordinating autonomous driving information from internal (e.g., the vehicle) and external sources (e.g., infrastructure), as well as, computing facilities to allow unrestricted monitoring of the exchange of autonomous driving information within the vehicle by the infrastructure.

Figure 1:
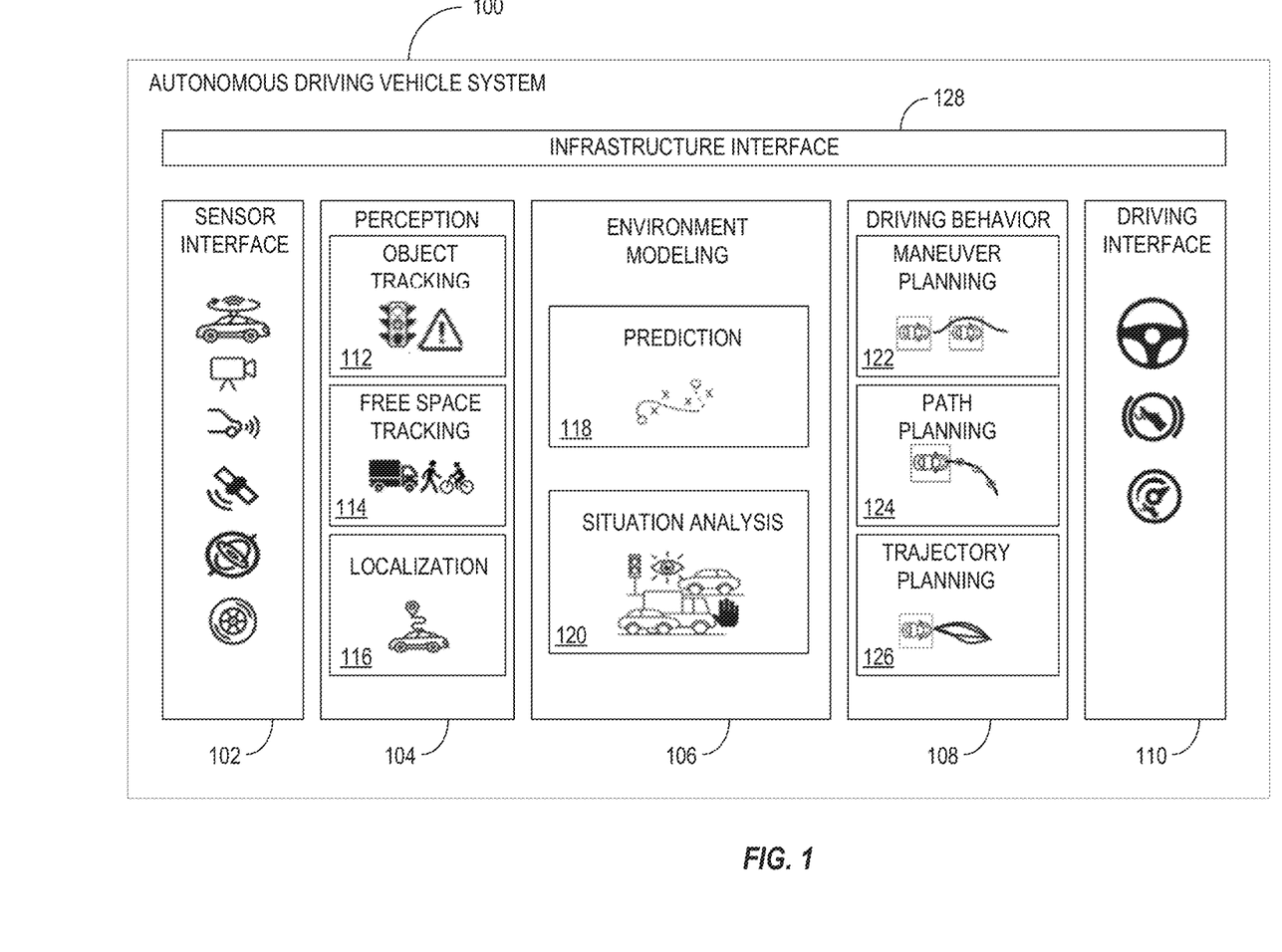
FIG. 1 illustrates generally a block diagram of an example autonomous driving system.

FIG. 1 illustrates generally a block diagram of an example autonomous driving system 10, or an autonomous vehicle control system (AVCS). The block diagram provides details of a software stack 102, 104, 106, 108, 110 for the autonomous driving system 100. The software stack can include a sensor interface 102, a perception processing circuit 104, an environment modeling circuit 106, a driving behavior circuit 108, and a driving actuator interface 110. The sensor interface 102 can receive signals from various sensors on an autonomous vehicle. The sensors can include, but are not limited to, radar, LiDAR cameras, ultrasound, infrared, global positioning system (GPS) receiver, satellite transducer, accelerometer, gyroscope, or combinations thereof. The perception processing circuit 104 can receive the signals from the sensor interface 102 and can generate perception information of the environment about the vehicle. Such perception information can be referred to object detection and tracking information 112, free space detection and tracking information 114, and localization information 116.

The environment modeling circuit 106 can receive the perception information 112, 114, 116 and can generate model information about the environment about the vehicle as well as information about the destination of the vehicle and navigation or mapping information such as detailed mapping information of the locality of the vehicle. The model information can include predictive information 118 about various paths to the destination and situational information 120 about the environment about the vehicle including information about other nearby vehicles, and information about pedestrians near the vehicle. The driving behavior circuit 108 can receive the model information 118, 120 and can plan various actions for the vehicle. Such actions can include, but are not limited to, path planning 122, maneuver planning 124, and trajectory planning 126. Path planning 122 can provide coarse information about the path to the destination, maneuver planning 124 can provide more detailed information about navigating turns and unexpected events such as passing another vehicle or providing room for a bicyclist on the side of the road, and trajectory planning 126 can provide even finer path details during the course of a maneuver. The driver actuator interface 110 can receive the path planning 122, maneuver planning 124 and trajectory planning 126 information and can generate commands for moving and steering the vehicle as well as receiving feedback about speed, acceleration, steering wheel direction, etc.

The example autonomous driving system 100 can also include a infrastructure interface 128. The infrastructure interface 128 can allow for autonomous driving within a restricted area. In certain examples, the infrastructure interface 128, upon detection of a restricted area, can negotiate verification of the autonomous vehicle with a security controller of the restricted area and can allow for the infrastructure of the restricted area to selectively influence sensor input, perception processing, environment modeling, driver behavior tasks, or combinations thereof of the software stack of the autonomous vehicle. The specific tasks selected to be influenced by the infrastructure can depend on a restriction level of the area to be traversed by the autonomous vehicle.

Figure 2:
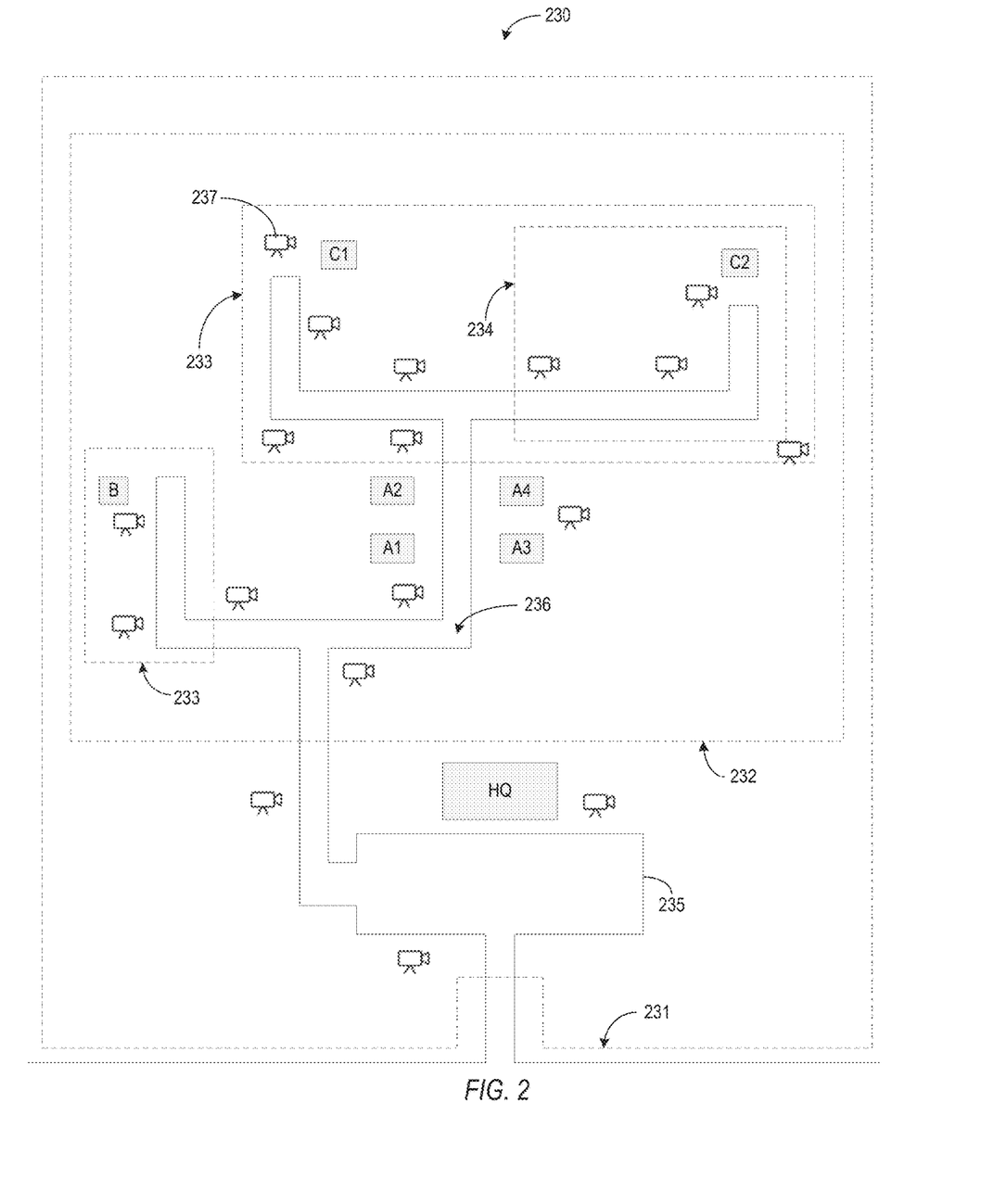
FIG. 2 illustrates generally an environment that can allow an autonomous vehicle with an example autonomous driving system to autonomously navigate within restricted areas of the environment.

FIG. 2 illustrates generally an environment 230 that can allow an autonomous vehicle with an example autonomous driving system to autonomously navigate within restricted areas 231, 232, 233, 234 of the environment 230. The illustrated environment 230 can be analogous to a large campus such as a large corporate campus, a large government campus or a military installation, but the subject matter is not limited as such. Aspects of the present subject matter can be applied to other forms of restricted areas.

The environment 230 can include a parking lot 235, several roadways 236, and several buildings (An, B, Cn, HQ). The environment 230 can also include a number of restricted locations 231, 232, 233, 234, for example, a majority of the campus can be within a first-level restricted area 231. A second area 232, including a subset of the buildings (An, B, Cn) on the campus can be in a second-level restricted area. Third and fourth areas can be in third-level restricted areas 233. A fifth area can be within a fourth level restricted area 234. For this example, as the restriction level increases, the security concern of the area becomes higher and the security procedures for those entering or exiting the area can become more intensive or restrictive. In certain examples, as the restriction level increases, the operation of autonomous driving within each restriction-level area can change.

The environment 230 can also include a number of sensors 237 for detecting activity within each restricted area 231, 232, 233, 234 of the campus. Some sensors 237 can be used for conventional security purposes as well as to assist in allowing autonomous driving within a restricted area. Other sensors 237 can be primarily for assisting in autonomous driving within the campus. The sensors 237 can include, but are not limited to, radar, LiDAR, cameras, ultrasound, infrared, global positioning system (GPS) receiver, satellite transducers, vehicle detectors, in-road proximity sensors, or combinations thereof. As used herein, such sensors 237, and support processors and circuits, that assist in autonomous driving may be referred to as "infrastructure".

Figure 3:
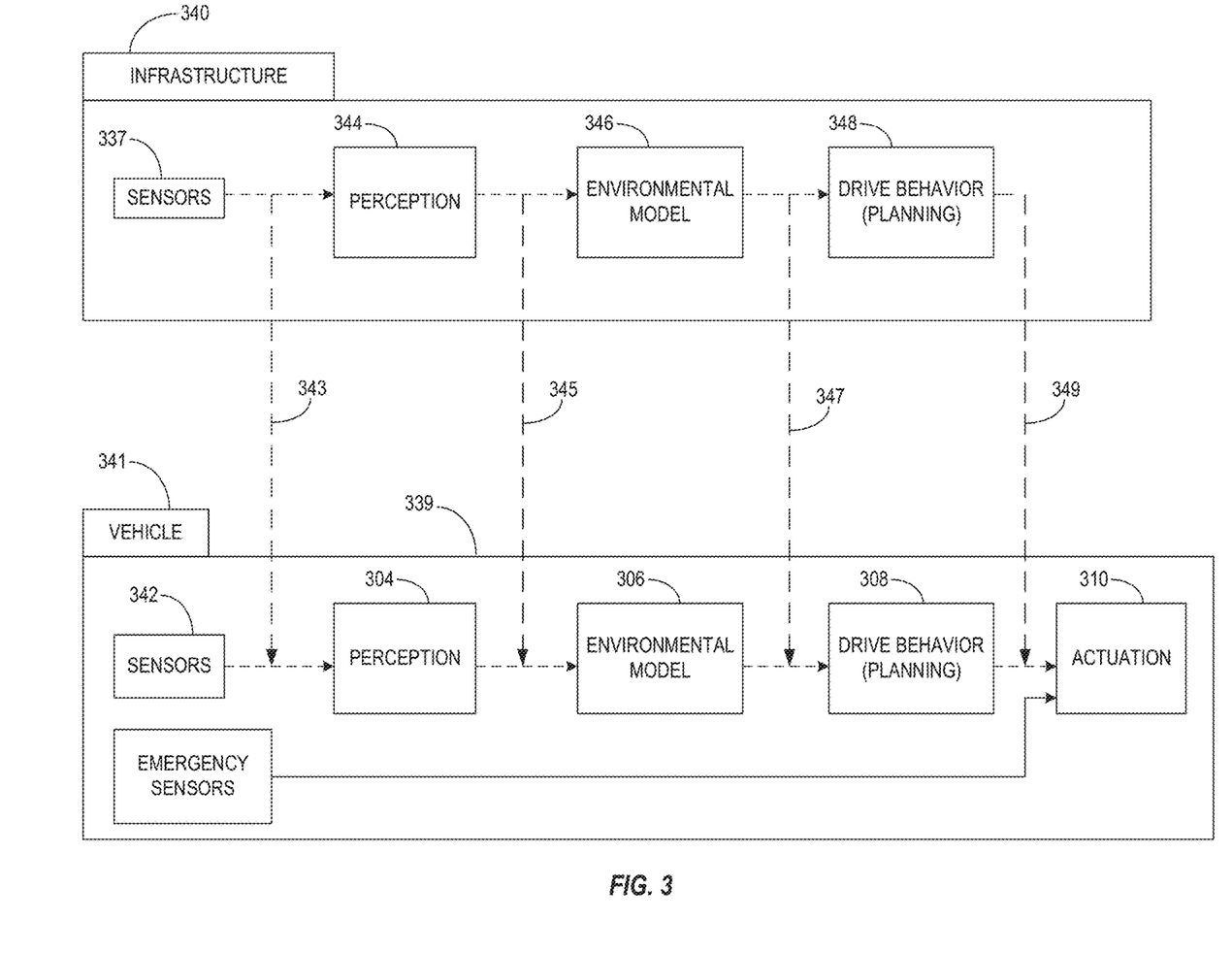
FIG. 3 illustrates an operation overview of an example interface between infrastructure of a restricted area and an autonomous vehicle including an example autonomous driving system.

FIG. 3 illustrates an operation overview of an example interface between infrastructure 340 of a restricted area and an autonomous vehicle 341 including an example autonomous driving system 339. The example interface allows the infrastructure 340 of the restricted area to take over certain autonomous driving functions that would normally be executed by processors of the autonomous vehicle 341. The autonomous vehicle 341 can include sensors 342, actuators and one or more processors to implement and execute an autonomous driving software stack that can include interfacing with the sensors 342, perception processing 304, environment modeling 306, drive behavior planning 308 for routes, maneuvers and trajectories, and interfacing 310 with the actuators. The actuators can provide the mechanical energy to move and guide the vehicle.

Like the autonomous driving software stack of the autonomous vehicle 341, the infrastructure 340 can include sensors 337 and one or more processors and circuits for interfacing with the infrastructure sensors 337, generating perception information of the environment 344, generating modeling information of the environment 346, and generating information drive behavior 348 such as route planning, maneuver planning and trajectory planning. The environment is generally static in most cases, but the infrastructure includes sensors 337 to detect the environment none the less, as any change to static components of the environment can affect autonomous navigation of the environment. In addition, the sensors 337 also detect and assist with tracking non-static components of the environment such as vehicle, pedestrians, equipment and unexpected objects that may or may not affect autonomous navigation or security of the restricted areas.

In certain examples, as the autonomous vehicle 341 enters and navigates a restricted area, the infrastructure 340 can shut down and replace certain elements of the autonomous driving functions 304, 306, 308 of the autonomous vehicle 341. For example, while navigating a low-level area of restriction, the autonomous vehicle 341 and infrastructure 340 can negotiate that the infrastructure 340 provide sensor information 343 for perception processing at least at the autonomous vehicle 341. In some examples, such negotiation may require that the sensors 342 of the vehicle, other than emergency sensors 339, shutdown. Such a requirement can assure that sensitive features of the restricted area are not recorded by the autonomous vehicle 341 and therefore can prevent the sensitive features form being disclosed outside of the restricted area. In certain examples, the autonomous vehicle 341 may continue to enable certain emergency sensors 339 and processing such sensor information for free space perception, for example, for the purpose of allowing the autonomous vehicle 341 to take evasive maneuvers to avoid unexpected events such as a person, animal or other vehicle that suddenly veers into the path of the autonomous vehicle 341.

Upon entering a more restrictive area, for example, a second-level restricted area, the infrastructure 340 can shutdown sensors 342, and the sensor interface and perception processing 304 of the software stack of the autonomous driving capabilities of the autonomous vehicle 341. The infrastructure 340 can supply the perception information 345 to the environment modeling 306 of the software stack of the autonomous driving capabilities of the autonomous vehicle 341 such that the autonomous vehicle 341 can navigate the restricted area.

Upon entering a further restrictive area, such as a third-level restrictive area, the infrastructure 340 can shutdown sensors 342, and the sensor interface, perception processing 304, and environment modeling 306 of the software stack of the autonomous driving capabilities of the autonomous vehicle 341. The infrastructure 340 can supply the environment planning information 347 to the planning processing 308 of the software stack of the autonomous driving capabilities of the autonomous vehicle 341.

Upon entering a further restrictive area, such as a fourth-level restrictive area, the infrastructure 340 can shutdown sensors 342, and the sensor interface, the perception processing 304, environment modeling 306, and planning processing 308 of the software stack of the autonomous driving capabilities of the autonomous vehicle 341. Path planning, maneuver planning and trajectory planning information 349 can be supplied by the infrastructure 340 to the actuator interface 310 of the software stack of the autonomous driving capabilities of the autonomous vehicle 341 and the actuator interface can generate commands for moving and steering the vehicle as well as receiving feedback about speed, acceleration, steering wheel direction, etc. Although the illustrated example sets forth a four-level restriction scenario for an autonomous vehicle, it is understood that other restriction level setups are possible without departing from the scope of the present subject matter. In certain examples, a most restrictive area may disable much of the autonomous driving functions of the autonomous vehicle 341 and allow infrastructure personnel remotely drive the autonomous vehicle 341.

Figure 4:
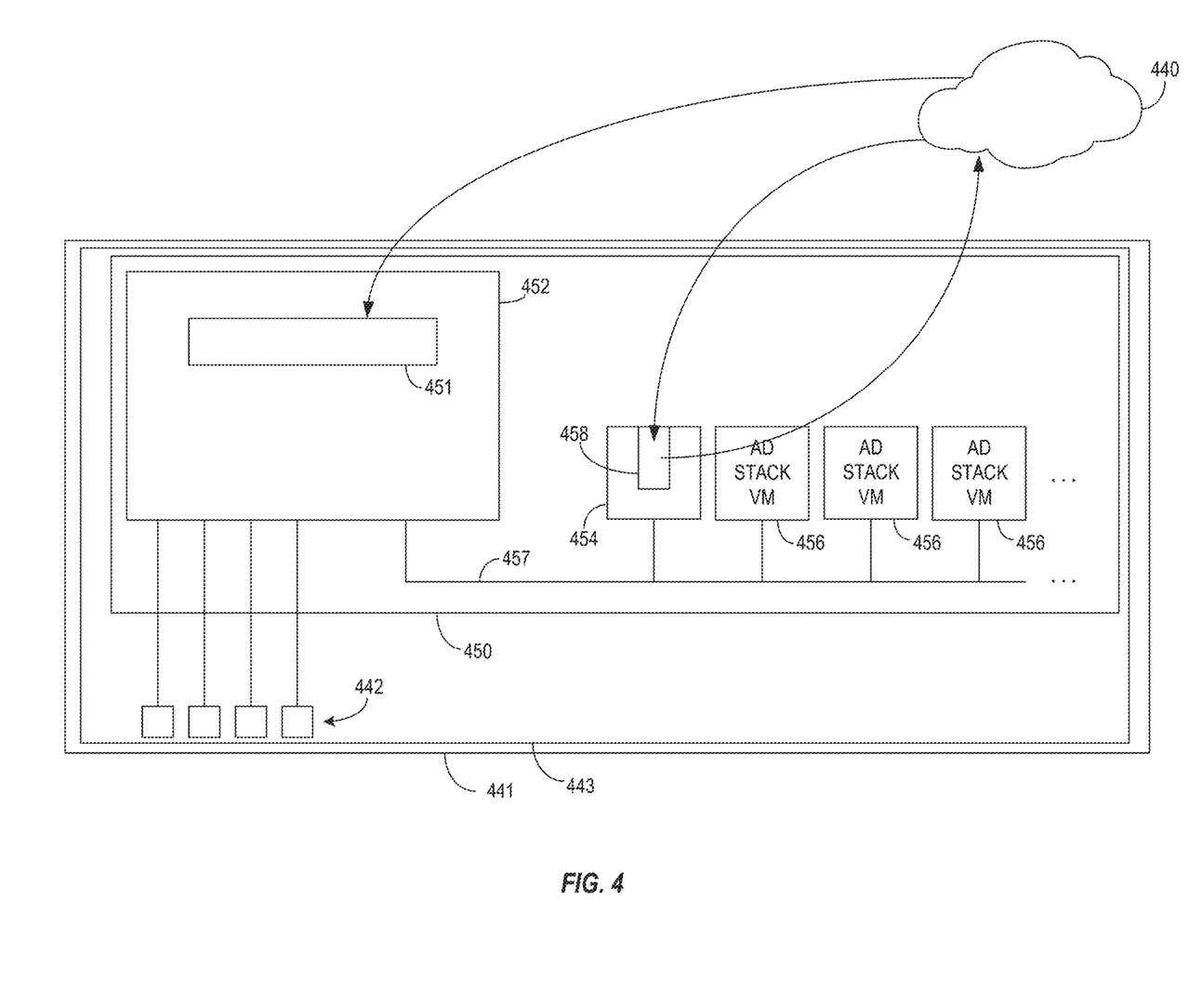
FIG. 4 illustrates generally an example control circuit of an autonomous vehicle for interfacing with infrastructure of a restricted area.

FIG. 4 illustrates generally an example control circuit 450 of an autonomous vehicle 441, which contains an autonomous vehicle system 443, for interfacing with infrastructure 440 of a restricted area. The control circuit 450 can include a security circuit 452 (e.g., security processor), an infrastructure monitoring circuit 454, and one or more virtual machines 456 that provide at least some of the functionality of the software stack 102, 104, 106, 108, 110 shown in FIG. 1. In certain examples, the control circuit 450 can provide one virtual environment, the infrastructure monitoring circuit 454, with read access to virtual sensor drivers and a security monitor stub 458 to receive a signed app from the infrastructure 440. The infrastructure 440 can install the signed app into the infrastructure monitoring circuit 454. The allowance of the infrastructure 440 to install an application within the control circuit 450 of the vehicle 441 can assure that the source of the application is not faked, or malicious toward the restricted area. The security monitoring circuit 454 with the signed application can monitor the virtual sensor drivers that are activated by the security circuit 452 and can report the observed sensor access to the infrastructure 440.

In certain examples, the signed application and infrastructure monitoring circuit 454 do not have access to the requested security level requested by the infrastructure 440. The signed application and infrastructure monitoring circuit 454 act autonomously and report observations about sensor access at the vehicle 441 to a remote infrastructure controller. The controller of the infrastructure 440 can execute a rule checker that compares the expected sensor and autonomous driving information on a bus 457 of the control circuit 450 for the requested security level with the reports of the signed application and infrastructure monitoring circuit 454. Because the monitoring application is installed in a separate virtual environment, it does not have access to any other functionality in the infrastructure 440 or the vehicle 441.

If the controller of the infrastructure 440 confirms reported bus activities match the expected bus activities associated with the requested security level, the controller of the infrastructure 440 can transmit previously negotiated data types to the vehicle 441 in order to facilitate autonomous driving of the vehicle 441 to the destination. Throughout each journey through restricted areas, the controller of the infrastructure 440 can monitor and guide the position of the autonomous vehicle 441 together with all other objects on the road. When the autonomous vehicle 441 leaves the compound or a restricted area, the event can be detected by the controller of the infrastructure 440 and an appropriate release signal can be sent to the autonomous vehicle 441 to remove restrictions placed on the software stack of the autonomous driving functions.

The one or more virtual machine 456 can include the individual components of the software stack of the autonomous driving functionality of the autonomous vehicle, as well as, the security monitor 454 for the infrastructure controller as discussed above. The virtual machines 454, 456 can share the bus 457 with the security circuit 452 for at least receiving pertinent information for providing the autonomous driving functions.

The security circuit 452 can authenticate the autonomous vehicle 441 with the controller of the infrastructure 440 and can assist in authenticating the passengers in certain examples. Upon completing authentication tasks, the security circuit 452 can receive a security level request at a security coordinator circuit 451 and the security coordinator circuit 451 can control the exchange of various autonomous driving information between the autonomous vehicle 441, the virtual machines 454, 456, and the infrastructure 440. For example, if the infrastructure 440 provides a first security level, such as a low security level, the security coordinator circuit 451 can disable certain sensors 442 of the autonomous vehicle 441 and replace the information provided by such sensors 442 with information provided by the infrastructure 440. Such information can be communicated to the vehicle over a wireless network, such as an encrypted wireless network.

As the security circuit 452 adjusts the information provided, for example, to a perception processing virtual machine (456), the infrastructure 440 can monitor the transition and ongoing conformity of the bus activity for the security level requested via the reports provided by the signed application and infrastructure monitoring circuit 454. In certain examples, for a higher-level security request, the security circuit 452 can disable communicating vehicle generated perception information on the bus 457 and can replace such perception information on the bus 457 with perception information received from the infrastructure 440. Again, the infrastructure 440 can monitor the bus activity and ongoing conformity of the security circuit for the security level requested via the reports provided by the signed application and infrastructure monitoring circuit 454.

In some examples, disabling communication of vehicle generated perception information can include disabling or shutting down the virtual machine (456) executing the perception functions of the software stack of the autonomous driving functions.

Requests for increasing levels of security form the infrastructure 440 can result in the security circuit 452 replacing more and more vehicle generated information of the virtual machines 456 with infrastructure generated information. A high level security request can result in the security circuit 452 receiving route planning information, maneuver information, and trajectory information from the infrastructure 440 and can relay that information via the bus 457 to an actuator interface of the autonomous vehicle 441 such that the infrastructure 440 provide substantially direct commands to control the speed and direction of the autonomous vehicle 441. In certain examples, the autonomous control system of the vehicle, or a portion thereof such as the security processor or circuit, can be registered with the infrastructure so that the infrastructure can recognize the systems for potential autonomous driving privileges within one or more of the restricted areas.

As discussed above, when operating within a restricted area, the infrastructure 440 can monitor the restricted operation of the autonomous driving functionality of the vehicles autonomous driving functions via reports from a signed application the infrastructure downloaded to the autonomous vehicle 441 by the infrastructure 440. If the reports indicate that vehicle generated information or sensors 442 are being used in violation of the current security level, the infrastructure 440 can instruct the autonomous vehicle 441 to safely pull over to a curb and stop until the discrepancy can be resolved.

Figure 5:
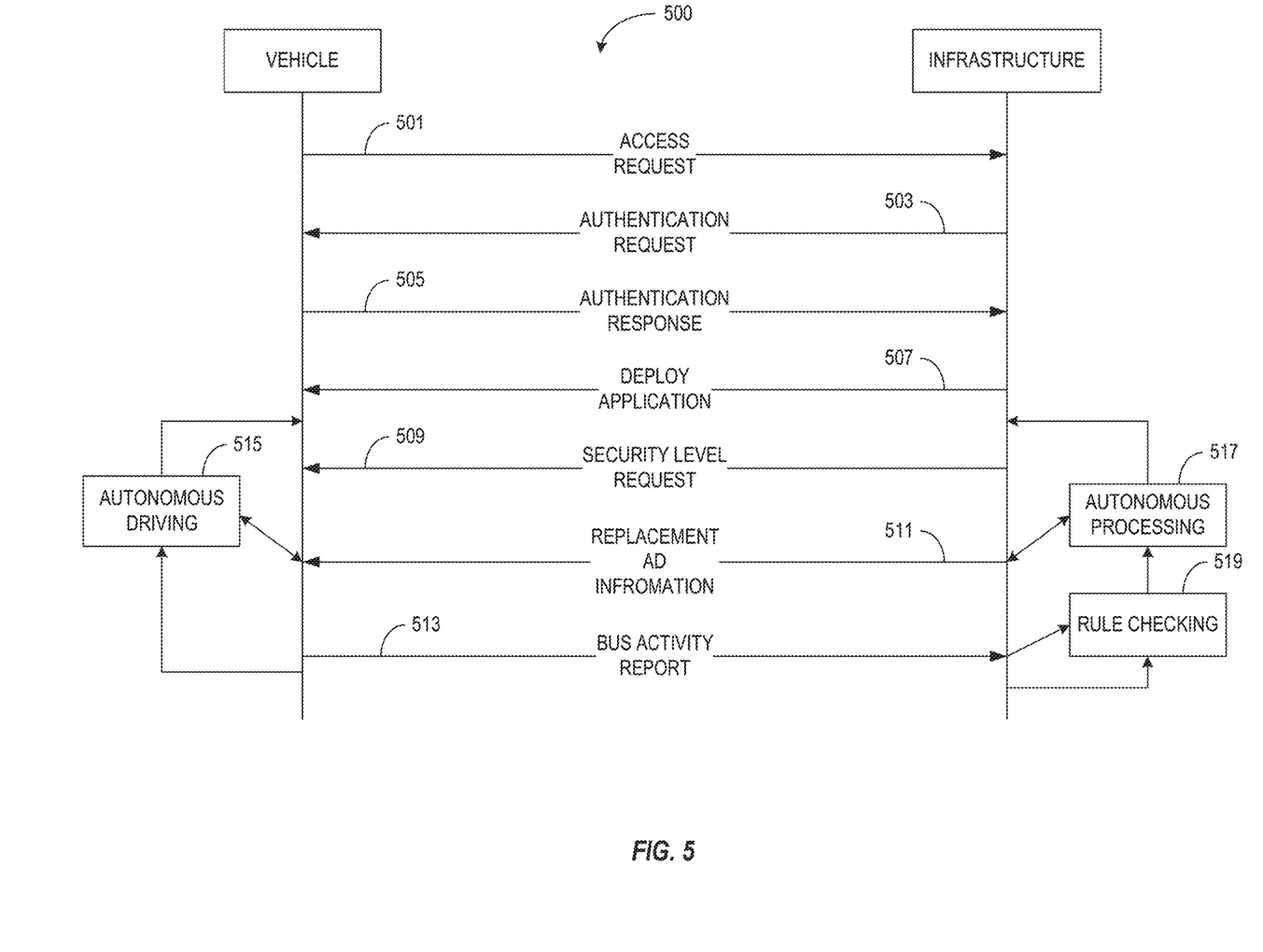
FIG. 5 illustrates generally an example method for operating an example autonomous driving system within a restricted area.

FIG. 5 illustrates generally an example method 500 for operating an example autonomous driving system within a restricted area. At 501, a controller of an autonomous vehicle can request access to use autonomous driving functions within the restricted area from infrastructure of the restricted area. In certain examples, a user of the autonomous vehicle can initiate the request upon entering and recognizing the area as restricted. In some examples, a controller of the autonomous vehicle can recognize the area as restricted, such as from GPS and mapping information, and can automatically issue the request. At 503, the controller of the vehicle can receive an authentication request from the infrastructure. At 505, the controller of the vehicle can provide an authentication response. In certain examples, a response to the authentication request can provide identifying information about the autonomous vehicle and technical details about the autonomous driving system of the autonomous vehicle. In addition, the authentication response or ongoing communication for authentication can include validating the passengers, passing the infrastructure a representation of the destination, and negotiating autonomous driving functionality that may be performed by both the infrastructure and the vehicle. At 507, the infrastructure can deploy a signed application for installation and execution on the control circuit of the vehicle. At 509, the infrastructure can request the vehicle to configured for a requested security level. At 511, the infrastructure can provide replacement autonomous driving (AD) information to the vehicle to replace information inhibited from being generated by the vehicle under the requested security level. At 513, execution of the signed application can report information about the operation of the autonomous vehicle under the requested security level. Such information can include, among other things, information about the activity of the bus of a security circuit of the autonomous vehicle. At some point after the vehicle has been authenticated by the infrastructure, the vehicle can start autonomously driving 515, and the signed application can periodically report to the infrastructure. In addition, the infrastructure can begin, at 517, to process and generate autonomous driving information inhibited to be generated by the vehicle and can provide the autonomous driving information to the vehicle. The infrastructure can also, at 519, rule check the reported information from the vehicle against expected report information for the requested security level. If the rule checking passes, the infrastructure continues to monitor the location and movement of the vehicle and provide replacement autonomous driving information as needed until the vehicle gets to the predetermined destination or the vehicle leaves the restricted area.

Upon entering an area with a different security level, the infrastructure can update the security level request at 509 and monitor the vehicle via rule checking at 519 for conformity to the new security request. If the rule checking at 519 determines a discrepancy between the activity of the vehicle and the expected activity of the vehicle, the infrastructure can command that the vehicle stop until the discrepancy is resolved. When the vehicle leaves a restricted area and enters into an unrestricted area, the infrastructure or the vehicle can release the restrictions on the vehicle autonomous driving functions and can terminate and erase the signed application.

The present subject matter provides a system that balances the security and privacy interests of a facility with the sensing interests of an autonomous driving system. A system or components conforming the present subject matter can allow an autonomous vehicle to navigate a facility without intentionally recording or disclosing sensitive information about the facility.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 6:
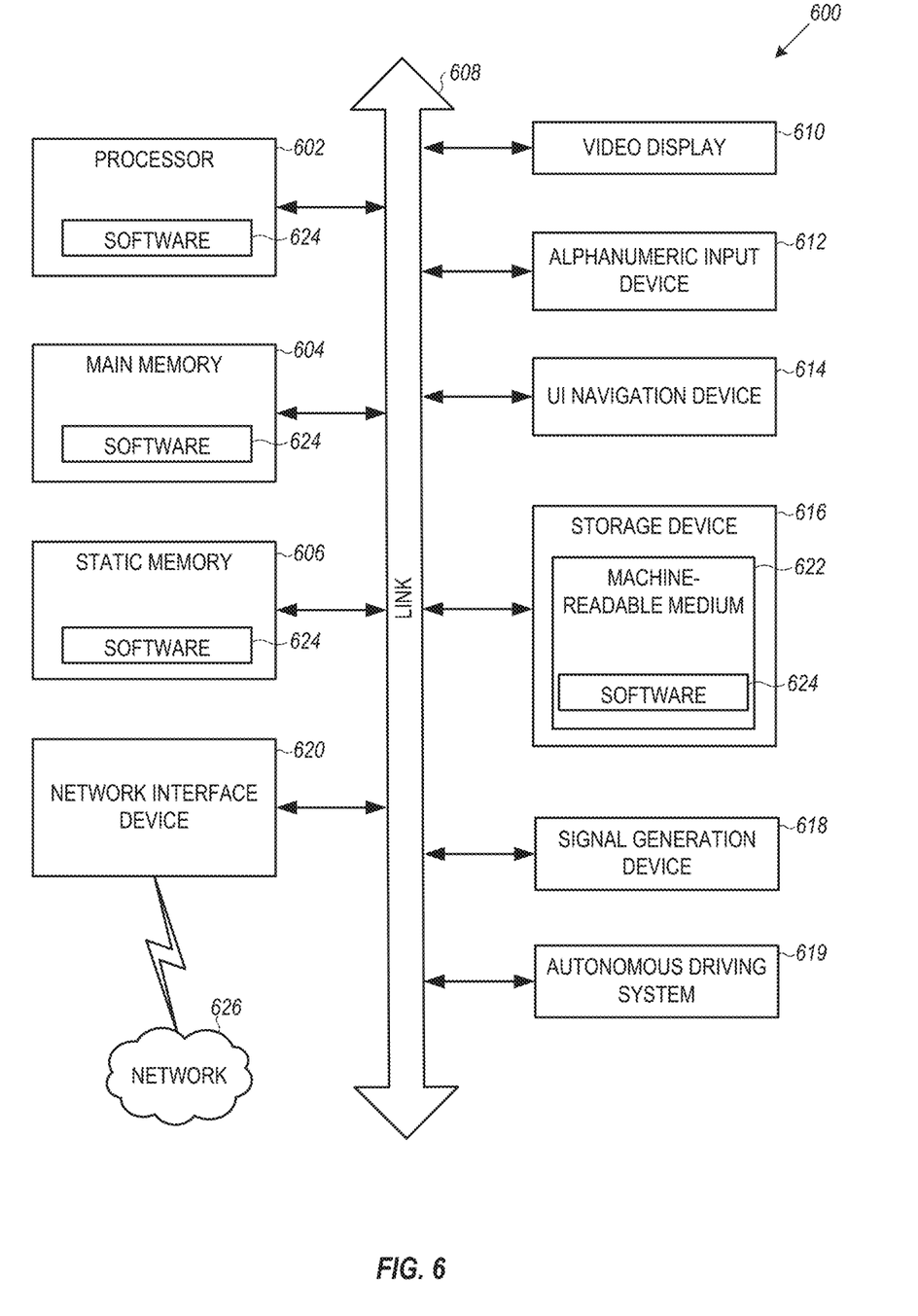
FIG. 6 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 6 is a block diagram illustrating a machine in the example form of a computer system 600, within which a set or sequence of instructions may be executed to cause the machine to perform any one or more of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor. In an example embodiment, the computer system 600 may further include an autonomous driving system 619, which may have functionalities similar to the autonomous driving system 100 described in reference to FIG. 1, as well as other places in the present document.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an autonomous vehicle control system (AVCS) comprising: a sensor interface to obtain data from multiple sensors for detecting a first environment about a vehicle and to provide first sensor information; a security processor configured to receive the first sensor information and to provide first autonomous driving information; an autonomous driving system including a set of virtual machines configured to receive the first autonomous driving information from the security processor; and wherein the security processor is configured to ignore first sensor information from the sensor interface in response to a first security request received from an infrastructure of a restricted area, and to provide second sensor information received from the infrastructure to the autonomous driving system in response to the first security request.

In Example 2, the subject matter of Example 1 includes, a bus configured to exchange the first autonomous driving information between the security processor and the set of virtual machines.

In Example 3, the subject matter of Example 2 includes, a security monitor stub configured to receive and execute a set of instructions from the infrastructure for monitoring activity on the bus and to report the activity on the bus to the infrastructure.

In Example 4, the subject matter of Examples 1-3 includes, wherein the set of virtual machines include a security monitor stub, the security monitor stub configured to receive and interface with a signed application received from the infrastructure.

In Example 5, the subject matter of Examples 1-4 includes, wherein the set of virtual machines include a first virtual machine configured to selectively perform perception processing based on the first autonomous driving information.

In Example 6, the subject matter of Example 5 includes, wherein the set of virtual machines include a second virtual machine configured to selectively perform modeling of the first environment.

In Example 7, the subject matter of Example 6 includes, wherein the set of virtual machines include a third virtual machine configured to provide route planning through the first environment.

In Example 8, the subject matter of Example 7 includes, wherein the third virtual machine is configured to provide commands to actuators of the vehicle to execute a route through the first environment.

Example 9 is a method comprising: authenticating an autonomous vehicle control system (AVCS) of a vehicle to infrastructure of a restricted area; receiving a first security request at a security processor of the AVCS; and replacing, on a bus of the AVCS, first sensor information received from sensors of the vehicle with second sensor information in response to the first security request.

In Example 10, the subject matter of Example 9 includes, receiving the second sensor information from the infrastructure via a wireless network.

In Example 11, the subject matter of Example 10 includes, providing direction to the vehicle to move based on the second sensor information.

In Example 12, the subject matter of Examples 9-11 includes, wherein authenticating the AVCS to the infrastructure includes receiving a signed application from the infrastructure.

In Example 13, the subject matter of Example 12 includes, executing the signed application in a first virtual machine within the AVCS system.

In Example 14, the subject matter of Example 13 includes, reporting activity of the bus to the infrastructure.

In Example 15, the subject matter of Example 14 includes, comparing the activity reported to the infrastructure with expected activity to determine whether the AVCS system complied with the first security request; and instructing the vehicle to stop if the AVCS system did not comply with the first security request.

In Example 16, the subject matter of Examples 13-15 includes, receiving a second security request from the infrastructure at the AVCS system; and replacing, on the bus, first perception information received from a second virtual machine of the AVCS with second perception information in response to the second security request, the second perception information received from the infrastructure.

Example 17 is at least one machine-readable medium including instructions for providing autonomous driving functions within a restricted area, the instructions when executed by a machine, cause the machine to perform operations comprising: authenticating an autonomous vehicle control system (AVCS) of a vehicle to infrastructure of the restricted area; receiving a first security request at a security processor of the AVCS; and replacing, on a bus of the AVCS, first sensor information received from sensors of the vehicle with second sensor information in response to the first security request.

In Example 18, the subject matter of Example 17 includes, wherein the operations further include receiving the second sensor information from the infrastructure via a wireless network.

In Example 19, the subject matter of Examples 17-18 includes, wherein the operations further include moving the vehicle based on the second sensor information.

In Example 20, the subject matter of Examples 17-19 includes, wherein the operation of authenticating the AVCS to the infrastructure includes: receiving a signed application from the infrastructure; executing the signed application in a first virtual machine within the AVCS; and reporting activity of the bus to the infrastructure.

In Example 21, the subject matter of Example 20 includes, wherein the operations include: receiving a second security request from the infrastructure at the AVCS; and replacing, on the bus, first perception information received from a second virtual machine of the AVCS with second perception information in response to the second security request, the second perception information received from the infrastructure.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An autonomous vehicle control system (AVCS) comprising:
   a sensor interface to obtain data from multiple sensors for detecting a first environment about a vehicle and to provide first sensor information;
   a security processor configured to receive the first sensor information and to provide first autonomous driving information; and
   an autonomous driving system including a set of virtual machines configured to receive the first autonomous driving information from the security processor;
   wherein the security processor is configured to ignore first sensor information from the sensor interface in response to a first security request received from an infrastructure of a restricted area, and to provide second sensor information received from the infrastructure to the autonomous driving system in response to the first security request, the first security request dependent on a level of restriction assigned to the restricted area.

2. The AVCS of claim 1 including a bus configured to exchange the first autonomous driving information between the security processor and the set of virtual machines.

3. The AVCS of claim 2, including a security monitor stub configured to receive and execute a set of instructions from the infrastructure for monitoring activity on the bus and to report the activity on the bus to the infrastructure.

4. The AVCS of claim 1, wherein the set of virtual machines include a security monitor stub, the security monitor stub configured to receive and interface with a signed application received from the infrastructure.

5. The AVCS of claim 1, wherein the set of virtual machines include a first virtual machine configured to selectively perform perception processing based on the first autonomous driving information.

6. The AVCS of claim 5, wherein the set of virtual machines include a second virtual machine configured to selectively perform modeling of the first environment.

7. The AVCS of claim 6, wherein the set of virtual machines include a third virtual machine configured to provide route planning through the first environment.

8. The AVCS of claim 7, wherein the third virtual machine is configured to provide commands to actuators of the vehicle to execute a route through the first environment.

9. A method comprising:
   authenticating an autonomous vehicle control system (AVCS) of a vehicle to infrastructure of a restricted area;
   receiving a first security request at a security processor of the AVCS;
   replacing, on a bus of the AVCS, first sensor information received from sensors of the vehicle with second sensor information from the infrastructure via a wireless network in response to the first security request, the first security request dependent on a level of restriction assigned to the restricted area; and providing direction to the vehicle to move based on the second sensor information.

10. The method of claim 9, wherein authenticating the AVCS to the infrastructure includes receiving a signed application from the infrastructure.

11. The method of claim 10, including executing the signed application in a first virtual machine within the AVCS.

12. The method of claim 11, including reporting activity of the bus to the infrastructure.

13. The method of claim 12, including comparing the activity reported to the infrastructure with expected activity to determine whether the AVCS complied with the first security request; and instructing the vehicle to stop if the AVCS did not comply with the first security request.

14. The method of claim 11, including:

receiving a second security request from the infrastructure at the AVCS; and replacing, on the bus, first perception information received from a second virtual machine of the AVCS with second perception information in response to the second security request, the second perception information received from the infrastructure.

15. At least one machine-readable medium including instructions for providing autonomous driving functions within a restricted area, the instructions when executed by a machine, cause the machine to perform operations comprising:

authenticating an autonomous vehicle control system (AVCS) of a vehicle to infrastructure of the restricted area;

receiving a first security request at a security processor of the AVCS, the first security request dependent on a level of restriction assigned to the restricted area;

replacing, on a bus of the AVCS, first sensor information received from sensors of the vehicle with second sensor information from the infrastructure via a wireless network in response to the first security request; and moving the vehicle based on the second sensor information.

16. The at least one machine-readable medium of claim 15, wherein the operation of authenticating the AVCS to the infrastructure includes:

receiving a signed application from the infrastructure;

executing the signed application in a first virtual machine within the AVCS; and reporting activity of the bus to the infrastructure.

17. The at least one machine-readable medium of claim 16, wherein the operations include:

receiving a second security request from the infrastructure at the AVCS; and replacing, on the bus, first perception information received from a second virtual machine of the AVCS with second perception information in response to the second security request, the second perception information received from the infrastructure.

18. The AVCS of claim 1 wherein:

the security processor is configured to individually control functionality provided by each of the virtual machines based on instructions and information from the infrastructure, the instructions and information are dependent on the level of restriction, and each level of restriction controls replacement of a different set of information to be provided by the virtual machines with a set of information to be provided from the infrastructure.

* * * * *